April 11, 1933. R. F. MORRISON 1,903,741
APPARATUS FOR AND METHOD OF TREATING ASPHALT BLOCKS
Filed Dec. 10, 1929 3 Sheets-Sheet 1
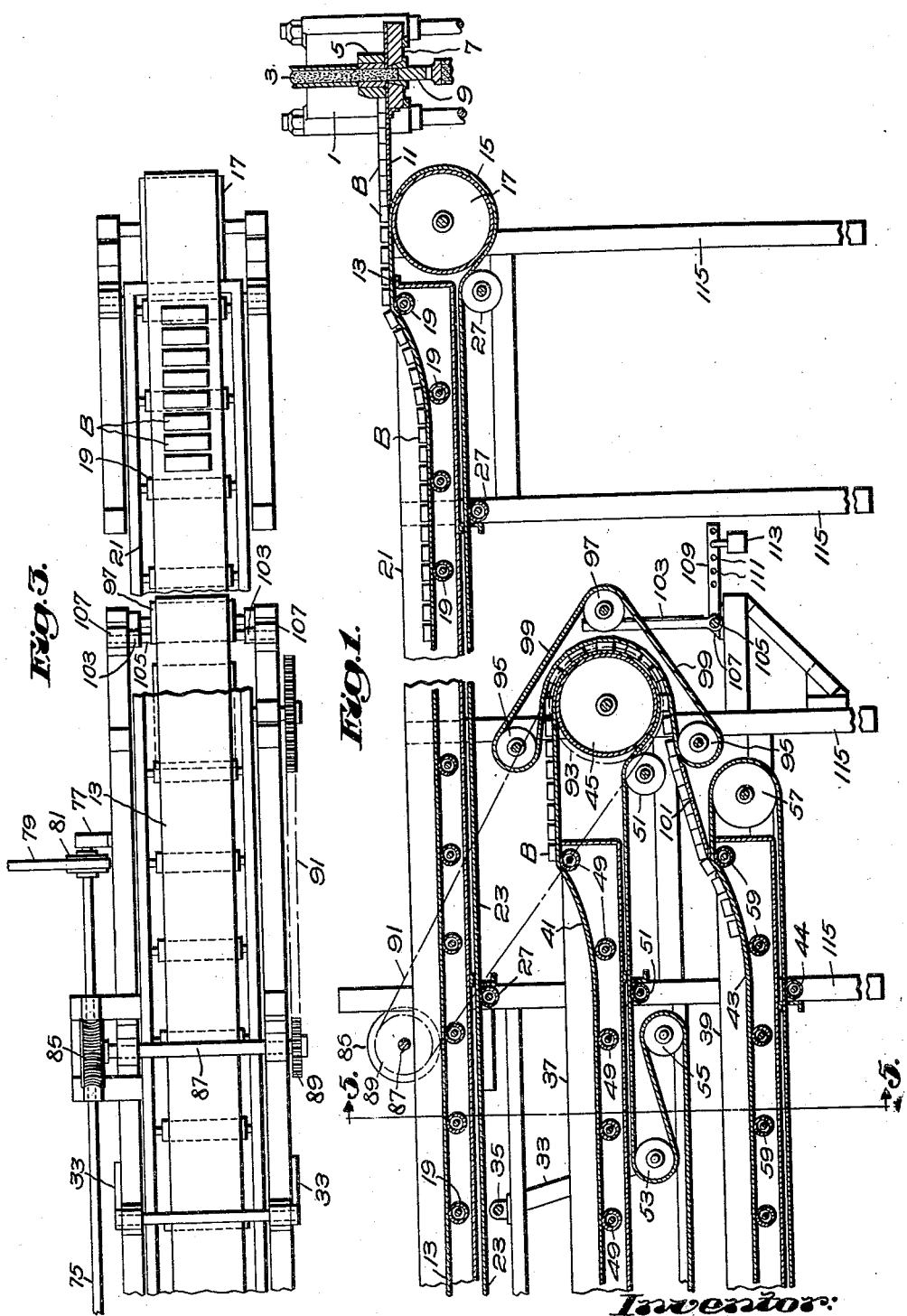

April 11, 1933.  R. F. MORRISON  1,903,741
APPARATUS FOR AND METHOD OF TREATING ASPHALT BLOCKS
Filed Dec. 10, 1929  3 Sheets-Sheet 2
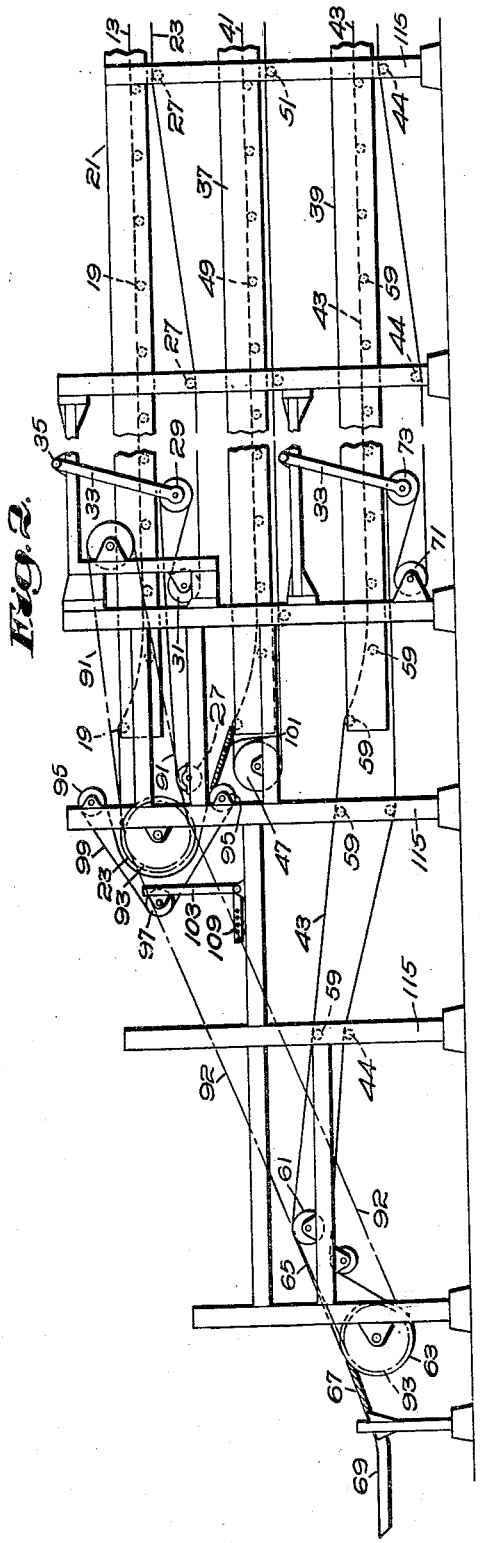
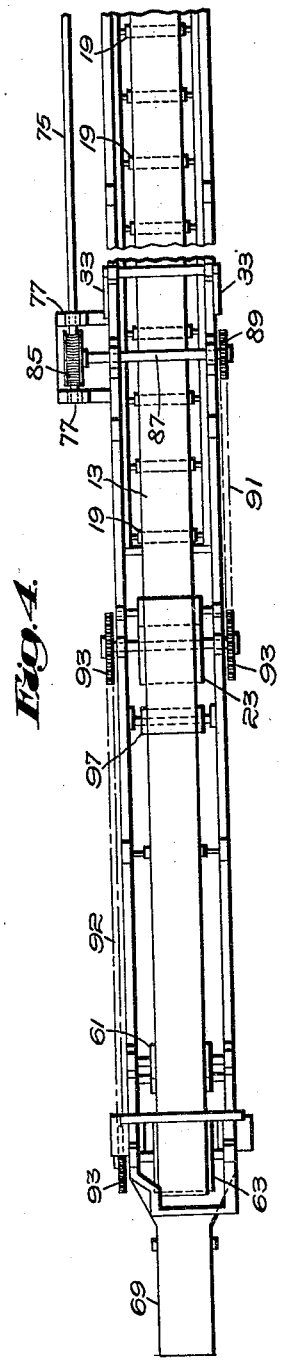
Inventor:
Robert F. Morrison April 11, 1933.  R. F. MORRISON  1,903,741
APPARATUS FOR AND METHOD OF TREATING ASPHALT BLOCKS
Filed Dec. 10, 1929  3 Sheets-Sheet 3

Inventor:
Robert F. Morrison

Patented Apr. 11, 1933

1,903,741

UNITED STATES PATENT OFFICE

ROBERT F. MORRISON, OF YONKERS, NEW YORK, ASSIGNOR TO THE INTERNATIONAL PAVEMENT COMPANY, OF NEW YORK, N. Y., A CORPORATION OF CONNECTICUT

APPARATUS FOR AND METHOD OF TREATING ASPHALT BLOCKS

Application filed December 10, 1929. Serial No. 413,030.

My invention relates to apparatus for and method of treating asphalt blocks, and will be best understood from the following description when read in the light of the accompanying drawings of one embodiment of the invention, while the scope of the invention will be more particularly pointed out in the appended claims.

In the drawings:—

Fig. 1 is a side elevation of one end of the apparatus with parts broken away and parts in section;

Fig. 2 is a side elevation of the opposite end of the apparatus on a smaller scale;

Figure 5:
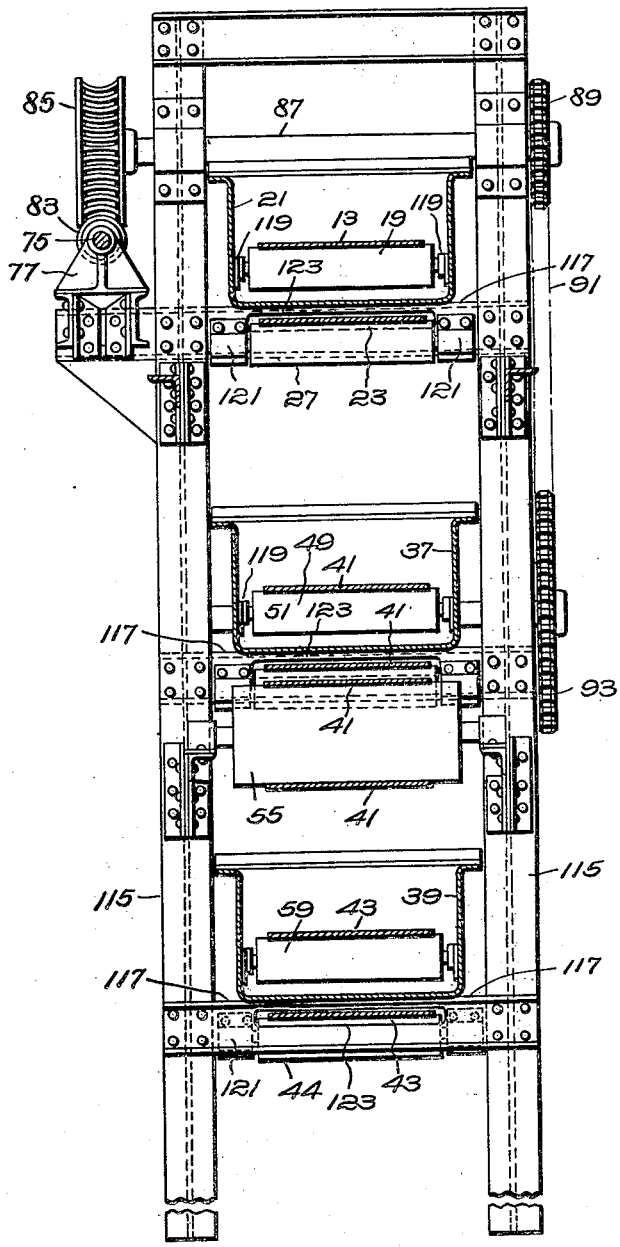

Figs. 3 and 4 respectively are plans of the apparatus corresponding to Figs. 1 and 2; and Fig. 5 is a section on the line 5—5 of Fig. 1.

Referring to the drawings, I have schematically indicated at 1 (Fig. 1) a press, as for example that shown by Whitney Patent No. 1,003,561, issued September 19, 1911, to which hot plastic asphalt compound is fed at 3, the press having a horizontally sliding head or mold cover 5 cooperating with a mold 7 and vertically sliding mold plunger 9 for forming the asphalt blocks B, which blocks as formed are pushed in a row by the sliding head along a platform 11, the latter terminating in substantially tangential relation to the end portion of the upper pass 13 of a belt conveyer 15, so as to place said blocks on said belt.

As shown (Fig. 1), the right hand end of the upper pass 13 of the belt conveyer 15 passes over a pulley 17, and is guided by the pulleys 19 through an elongated box or trough 21 containing water for cooling the blocks as the latter are caused to traverse it by the belt. For securing a suitable cooling action on the blocks, the trough may be of considerable length, say several hundred feet. Conveniently, suitable inlet and outlet pipes (not shown) are provided for continuously renewing the water in the trough, so as effectively to cool the blocks, and for keeping the level of the water above the latter. At the opposite end of the trough 21 (Fig. 2), the upper pass 13 of the belt is guided out of the trough by the pulleys 19, and passes over a pulley 23, the lower pass 25 of the belt being guided by pulleys 27 beneath the trough to the hereinbefore mentioned pulley 17 at the right end of the trough as viewed in Fig. 1. As shown in Fig. 2, the lower pass 25 of the belt 15 is looped over a pair of pulleys 29, 31, the pulley 29 being rotatably supported at opposite ends on arms 33, which latter are positioned at opposite sides of the trough 21 and pivoted at 35 to the framework, while the pulley 31 is rotatably supported by the framework with its axis in fixed relation thereto. In an obvious manner this construction provides for keeping the belt 15 under requisite tension.

As shown, beneath the box or trough 21 are similar boxes or troughs 37, 39, belts 41 and 43 similar to the belt 15 being provided for these troughs. As shown, the belt 41 passes about pulleys 45 and 47 which respectively are at opposite ends of the trough 37, guide pulleys 49 being provided for the upper pass of this belt and guide pulleys 51 for the lower pass of the belt, the lower pass of the belt being looped over pulleys 53 and 55 for tensioning the belt in the same manner as described in connection with the pulleys 29, 31 for tensioning the belt 15.

The belt 43 at the right hand end of the trough 39 (Fig. 1) is guided over a pulley 57, through which trough it is guided by the pulleys 59. Leaving the left hand end of the trough 39 the belt 43 passes over the pulleys 61 and 63, the former being higher than the latter so as to provide a downwardly inclined belt portion 65 for delivering the blocks to the downwardly inclined platform 67, down which platform they slide to a horizontal platform 69 from which the finally treated blocks may be removed. As shown, the lower pass of the belt 43 is guided by pulleys 44 and is looped over the cooperating pulleys 71, 73 (Fig. 2) for tensioning the belt.

For driving the belt conveyers 15, 41 and 43 I have herein shown a shaft 75 supported in a requisite number of bearings 77 at one side of the trough 21, the shaft being rotated in any convenient manner, as for example, by means of the belt 79 and pulley 81. Near opposite ends of the apparatus the shaft 75 is provided with worms 83 (Fig. 5) for driving worm wheels 85, the latter carried on shafts 87 which at the opposite side of the trough 21 form the worm wheels carrying chain sprocket wheels 89. As shown, the sprocket wheels 89 are connected by chains 91 to chain sprocket wheels 93 on one of the ends of the shafts for the pulleys 45 and 23, the worms on the shaft 75 being oppositely pitched so that the upper pass of the belt 15 will move to the left and the upper pass of the belt 41 to the right, as viewed in Figs. 1 and 2. The shaft of the pulley 63, for driving the belt 43, is connected to the shaft for the pulley 23 by means of similar sprocket wheels 93 and a chain 92, so that the lower belt 43 moves in the same direction as the upper belt 15.

The blocks are transferred from the left hand end of the belt 15 to the left hand end of the belt 41, and from the right hand end of the latter to the right hand end of the belt 43 by similar mechanisms, only one of which will now be described.

Referring to Fig. 1, associated with the pulley 45 are two pulleys 95, the latter having fixed axes of rotation and being positioned respectively above and below the pulley 45. Approximately in the same horizontal plane as the axis of the pulley 45 is a third pulley 97. Around these pulleys passes a secondary belt 99, said belt causing the blocks B to be guided around the pulley 45 and to be delivered to an inclined platform 101 which at opposite ends is so disposed relative to the belts 99 and 43 as to cause the blocks to be delivered from the former to the latter. Conveniently, for a purpose hereinafter described, the end of the platform 101 adjacent the belt 99 is slightly spaced, say about $\frac{5}{16}$ of an inch, from said belt, and the slope of the platform is such that the blocks will not slide down it under the force of gravity but must be pushed down it.

As shown, the shaft for the pulley 97 is mounted at opposite ends on the ends of arms 103, which arms are secured to the ends of a shaft 105 carried at opposite ends in fixed bearings 107, the shaft having rigidly secured thereto a substantially horizontal arm 109 provided with perforations 111 spaced longitudinally thereof, by means of which perforations a weight 113 may be secured at different points lengthwise of the arm 109 for variably tensioning the belt 99 and yieldingly urging it toward the pulley 45.

As indicated in the drawings, the parts heretofore described may be carried by a suitable framework, which as shown comprises a series of vertical posts 115 securely braced by the cross-members 117 (Fig. 5) upon which the boxes or troughs 21, 37 and 39 rest. As shown, the guide pulleys 19, 49 and 59 for the upper passes of the belt conveyers 15, 41 and 43 are rotatably supported in bearings 119 secured to the inner walls of the troughs, while the pulleys 27, 51 and 44 for the lower passes of these belt conveyers are supported in bearings 121 secured to the cross-members 17, the latter being slotted as indicated at 123 (Fig. 5) for permitting the belts to pass by them.

From the foregoing construction it will be observed that the hot blocks delivered from the press are progressively fed slowly through the superimposed troughs 21, 37 and 39 and finally delivered to the platform 69. During the passage of the blocks through the troughs they are cooled. Further, in transferring the blocks from one belt to the other the blocks are in effect "turned over" because the sides of the blocks which are uppermost when on the belt 41, for example, are those which were in contact with the belt 15 when conveyed by the latter. This "turning over" of the blocks effectively cools them by allowing all sides to contact with the water in the passage of the blocks through the apparatus.

A certain proportion of the blocks leaving the press, due to irregularities in the operation of the press mechanism, have fins at their edges. When the blocks pass over the pulleys 23 and 45 between the same and the belts 99 the fins are bent, first in one direction when passing over the pulley 23, and then in the opposite direction when passing over the pulley 45. This acts to break off the fins, especially as the material of the blocks becomes somewhat brittle when they are cooled by their passage through the troughs. The spaces between the ends of the platforms 101 and the belts 99 provide means for discharging the fins from the apparatus, because said fins will fall through said spaces.

In some instances, especially with relatively small, light blocks, the blocks frequently are stuck together when leaving the press. The bending action above described will break the blocks apart.

By making the platforms 101 of such slope that the blocks must be pushed down said platforms by successive blocks, each block, as it is moved by the belt into the plane occupied by said platform, engages with a block standing on the platform at the upper end thereof, which will prevent blocks being discharged from the belt from moving with the belt far enough to cause the edge of the block to move into the space between the upper end of the platform and the belt and catch on the edge of the platform. Also by causing the blocks to be pushed down the platforms, the series of blocks are straightened out in orderly fashion.

It will be understood that wide deviations may be made from the embodiment of the invention herein disclosed without departing from the spirit of the invention.

I claim:

1. Apparatus for treating asphalt blocks delivered from a block forming press comprising means for traversing a row of blocks, said means operative to bend fins at the edges of said blocks for breaking off said fins, said means providing a narrow slot over which said row passes to permit discharge of the broken off fins.

2. Apparatus for treating hot asphalt blocks delivered from a block forming press having, in combination, superimposed elongated cooling boxes, belt conveyers traversing said boxes, means for transferring the blocks successively from one belt to the other comprising means for guiding portions of said belts downwardly in substantially curved paths toward the next successive belt, secondary belts guided to engage the blocks on the downwardly directed portions of said belts, the downwardly directed portion of one of said belts being curved in the opposite direction from the downwardly directed portion of another of said belts, and means for placing said secondary belts under sufficient tension to break apart adjacent blocks which may be stuck together and to bend and break off fins at those edges of said blocks which are in contact with said belts.

3. Apparatus for treating hot asphalt blocks delivered from a block forming press having, in combination, superimposed elongated cooling boxes, belt conveyers traversing said boxes, means for transferring the blocks successively from one belt to the other comprising means for guiding portions of said belts downwardly toward the next successive belt, and secondary belts guided to engage and exert sufficient pressure on the longitudinal edges of the blocks on the downwardly directed portions of said belts to bend and break off fins at said edges.

4. Apparatus for treating hot asphalt blocks delivered from a block forming press having, in combination, superimposed elongated cooling boxes, belt conveyers traversing said boxes, means for transferring the blocks successively from one belt to the other comprising means for guiding portions of said belts downwardly in substantially curved paths toward the next successive belt, and secondary belts guided to engage and exert sufficient pressure on the longitudinal edges of the blocks on the downwardly directed portions of said belts to bend and break off fins at said edges, the downwardly directed portion of one of said belts being curved in the opposite direction from the downwardly directed portion of another of said belts.

5. Apparatus for treating hot asphalt blocks delivered from a block forming press having, in combination, a plurality of superimposed elongated cooling boxes, conveyer belts guided longitudinally through said boxes and passing over guide pulleys at opposite ends of said boxes, means for driving said belts to cause the portion of the belt in each box to move in the opposite direction from the corresponding portion of the belt in the box next above or below it, means for transferring the blocks from the belt of the uppermost box successively to the belts of the remaining boxes, said means comprising a secondary belt guided to present a portion opposite that portion of the conveyer belt which is in contact with the pulley at the end of the box from which the blocks are discharged and transferred to another belt, and means for urging said portion of said secondary belt toward said pulley under sufficient force to break apart adjacent blocks which may be stuck together and to bend and break off fins at those edges of said blocks which are in contact with said belts.

6. The method of treating hot asphalt blocks delivered in a row from a block forming press which comprises traversing said row and bending it alternately in opposite directions for breaking apart adjacent blocks which may be stuck together.

7. The method of treating hot asphalt blocks delivered in a row from a block forming press which comprises traversing said row through a cooling medium for cooling the blocks and eliminating the tackiness thereof and bending said row alternately in opposite directions for breaking apart adjacent blocks which may be stuck together.

8. The method of treating hot asphalt blocks delivered in a row from a block forming press which comprises traversing said row through a cooling medium in a plurality of passes by use of a belt conveyer, bending the row in opposite directions between passes through said medium and placing opposite sides of said blocks alternately in contact with said conveyer for alternate passes.

9. The method of treating hot asphalt blocks delivered from a block forming press which comprises subjecting edges of said blocks to bending action for breaking off fins at said edges.

10. The method of treating hot asphalt blocks delivered from a block forming press which comprises cooling said blocks to render them brittle and subjecting edges thereof to bending action for breaking off fins at said edges.

11. The method of treating hot asphalt blocks delivered from a block forming press which comprises subjecting edges of said blocks to bending action alternately in opposite directions for breaking off fins at said edges.

12. The method of treating hot asphalt blocks delivered from a block forming press which comprises cooling said blocks to render them brittle and subjecting edges thereof to bending action alternately in opposite directions for breaking off fins at said edges.

In testimony whereof, I have signed my name to this specification.

ROBERT F. MORRISON.